USO05394449A

United States Patent [19]
Johnson et al.

[11] Patent Number: 5,394,449
[45] Date of Patent: Feb. 28, 1995

[54] IMPACT LIMITER FOR SPENT NUCLEAR FUEL TRANSPORTATION CASK

[75] Inventors: Robert A. Johnson, Puyallup, Wash.; Ian D. McInnes, San Jose; Robert D. Quinn, Morgan Hill, both of Calif.; Charles J. Temus, Puyallup, Wash.

[73] Assignee: Pacific Nuclear Systems, Inc., Federal Way, Wash.

[21] Appl. No.: 131,972

[22] Filed: Oct. 8, 1993

[51] Int. Cl.[6] ............................................. G21F 5/008
[52] U.S. Cl. ........................... 376/272; 976/DIG. 346
[58] Field of Search ..................... 376/272; 250/506.1, 250/507.1; 976/DIG. 346

[56] References Cited

U.S. PATENT DOCUMENTS

| | | | |
|---|---|---|---|
| 3,754,140 | 8/1973 | Beierle | 376/272 |
| 4,423,802 | 1/1984 | Botzem et al. | 376/272 |
| 4,447,729 | 5/1984 | Doroszlai et al. | 250/507.1 |

OTHER PUBLICATIONS

"MH-1A Package" (originally licensed by the Nuclear Regulatory Commission in the 1970's).
"Application for NRC Certificate of Compliance Authorizing Shipment of Nuclear Material in NuPac Model 10-142 Packaging" (Apr. 1991).
Letter of Nov. 26, 1984 from the Nuclear Regulatory Commissioner and enclosures (26 Nov. 1984).
Letter of May 6, 1991 from the Nuclear Regulatory Commission and encloses (6 May 1991).
Letter of Nov. 19, 1992 from the Nuclear Regulatory Commission and encloses (19 Nov. 1992).
Meyer, R. J., "Development of the GA-4 and GA-9 Legal Weight Truck Spent Fuel Shipping Casks," *Radioactive Waste Management*, pp. 45-49 (Apr./May 1991).

*Primary Examiner*—Daniel D. Wasil
*Attorney, Agent, or Firm*—Christensen, O'Connor, Johnson & Kindness

[57] ABSTRACT

Impact limiters having noncircular outer peripheries are described for use to protect nuclear fuel transportation casks. The impact limiters include two different materials as impact absorbing materials. The impact limiter includes multiple sides and a tapered cap.

17 Claims, 6 Drawing Sheets

IMPACT LIMITER FOR SPENT NUCLEAR FUEL TRANSPORTATION CASK

FIELD OF THE INVENTION

The present invention relates to impact limiters for nuclear fuel transportation casks. The impact limiters protect the sealed transportation casks from damage during an impact that may occur during transportation of the cask, for example, from one storage site to another.

BACKGROUND OF THE INVENTION

One system for on-site storage of spent nuclear fuel utilizes a ventilated concrete horizontal storage module to passively store spent fuel assemblies sealed in a dry shielded canister containment vessel. The dry shielded canister containment vessel has an internal basket assembly with fuel storage locations similar to that of a fuel rack, each of which holds a spent fuel assembly. The loaded dry shielded canister is transferred from the planes spent fuel pool to a horizontal storage module located in an independent spent fuel storage installation using a transfer system that includes a transport trailer. The transfer system also includes an on-site transfer cask for containing the dry shielded canister containment vessel as it is being transferred from the fuel pool to the horizontal storage module. Once transferred to the storage installation, the dry shielded canister containment vessel is removed from the transfer cask and stored in the horizontal storage module until a monitored retrievable storage facility or a permanent storage facility is available.

As permanent storage facilities become available, it will be necessary for the dry shielded canister containment vessels to be transported from the on-site temporary storage facility to the off-site storage or disposal facility. Off-site transportation will use a transportation cask to contain the dry shielded canister vessel. Transportation of the spent nuclear fuel to off-site facilities will require that the dry shielded canister containment vessel and transportation cask be transported over public thoroughfares, such has highways, waterways, and railways.

During transportation, it is imperative that steps be taken to prevent leakage of radioactive material from the sealed cask and the containment vessel within the cask. Although the containment vessel and cask are shielded and sealed to prevent leakage, there is always a risk of damage to the cask and containment vessel caused by hypothetical accident impacts which might be encountered during transportation. Such impacts may be encountered during a collision involving the vehicle carrying the cask or possibly if the cask were to separate from the transportation vehicle during transportation.

One prior design for protecting the transportation cask and containment vessel from damage due to impacts includes "impact limiters" that include round, cylindrical elements carried on each end of the cylindrical transportation cask. Each impact limiter includes an annular region that encases a portion of one end of the cask. Such impact limiters include a foam, wood, or honeycomb material sandwiched between a rigid inner shell and a rigid outer shell. These impact limiters are designed to absorb energy upon impact and protect the transportation cask and containment vessel from damage.

Since the impact limiters must accompany the transportation cask over public thoroughfares, the space available for the impact limiters to pass through tunnels, bridges, and other highway, waterway, and railway features limits the overall size of impact limiters. The energy absorbing properties of the impact limiters with round, cylindrical elements often resulted in impact limiters that because of size limitations could not adequately protect a transportation cask that could carry a predefined amount of spent nuclear fuel. Therefore, in order to transport the predefined amount of spent nuclear fuel, additional trips would be necessary which increases the public's exposure to the fuel and the risk of an accidental incident. These previous impact limiters also generally employed one type of material, e.g., foam, wood, or honeycomb with directional crush properties in a given plane between the outer shell and the inner shell. Different densities of foam, wood, or honeycomb were used to soften the impact limiter in certain orientations in order to vary the crush characteristics. In addition, the impact absorbing material used in previous impact limiters was generally oriented radially between the inner and outer shell in order to take advantage of the properties of the material in its strongest direction.

Despite the existence of the foregoing impact limiter designs, there continues to be a need for improvements in impact limiters in order to protect the public from the catastrophic effects of an occurrence wherein the transportation casks and containment vessel are breached, and radiation from the spent nuclear fuel escapes. In addition, there continues to be a need for maximizing the amount of fuel that can be transported by a transportation cask and containment vessel so that the number of trips to transport a given amount of fuel can be reduced, thus minimizing the overall risk to the public.

SUMMARY OF THE INVENTION

In one aspect, the present invention relates to an impact limiter for protecting a nuclear fuel transportation cask and containment vessel, particularly as it is being transported across public thoroughfares. The impact limiter is designed to meet or exceed the regulatory requirements which are in place to protect the public from radiation by minimizing the risk that the integrity of the nuclear fuel transportation cask and containment vessel is breached upon an impact.

An impact limiter formed in accordance with this aspect of the present invention includes an annular body having an inner periphery defined by an inner shell that mates with the transportation cask and an outer periphery defined by an outer shell that is noncircular. The annular body includes an impact absorbing material sandwiched between the inner shell and the outer shell. A tapered cap projects from one end of the annular body and includes an outer periphery defined by an outer shell that is noncircular. The tapered cap also includes an impact absorbing material within the outer shell.

In a preferred embodiment of this aspect of the present invention, the outer shell of the annular body is multisided, for example, approximating an octagon. Likewise, in a preferred embodiment, the outer shell of the tapered cap in a given cross section is multisided, for example, approximating an octagon.

In a specific embodiment of this aspect of the present invention, the impact absorbing material sandwiched between the inner shell and the outer shell of the annular body is different from the impact absorbing material within the outer shell of the tapered cap. The use of two types of impact absorbing material allows for the design of an impact limiter that is capable of effectively protecting the nuclear fuel transportation cask and containment vessel from damage due to impacts in a plurality of orientations.

Another embodiment of this aspect of the present invention relates to the use of an aluminum honeycomb with cross laminated corrugations as the impact absorbing material within the annular body, and more particularly, to the axial manner in which bricks of this aluminum honeycomb with cross laminated corrugations are positioned between the inner shell and the outer shell in order to prevent the cask from separating the discreet sections of honeycomb material.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The impact limiters formed in accordance with the present invention are used in the transport of large casks that carry canisters which contain a plurality of spent nuclear fuel assemblies. The spent nuclear fuel assemblies are elongate rods that are carried within the canisters by a basket. The canister serves as a sealed enclosure around the basket. The canister is generally in the shape of a right cylinder. In addition to its use as a container to transport spent nuclear fuel over public thoroughfares, such canisters and baskets are employed to store and transfer spent nuclear fuel on-site, e.g., at a nuclear power plant. One such canister and basket combination is described in an application entitled Containers for Transportation and Storage of Spent Nuclear Fuel, filed on Oct. 8, 1993 and assigned U.S. application Ser. No. 08/131,971, naming Robert A. Lehnert, Robert D. Quinn, Steven E. Sislcy, and Brandon D. Thomas as inventors. The subject matter of the above-identified application is expressly incorporated herein by reference.

When the canisters containing the spent nuclear fuel are ready for transportation off-site over public thoroughfares, the canisters are removed from their temporary storage facility and placed within a transportation cask, which is generally a sealed steel vessel in the shape of a right cylinder. The canister is received within the transportation cask, which is then sealed. One such transportation cask for transporting the canister is described in an application entitled Transportation and Storage Cask for Spent Nuclear Fuel, filed on Oct. 8, 1993, and assigned U.S. application Ser. No. 08/131,973, naming Kyle B. Jones, Robert E. Lehnert, Ian D. McInnes, Robert D. Quinn, Steven E. Sislcy, and Charles J. Temus as inventors. The subject matter of the above-identified application is expressly incorporated herein by reference.

Figure 1:
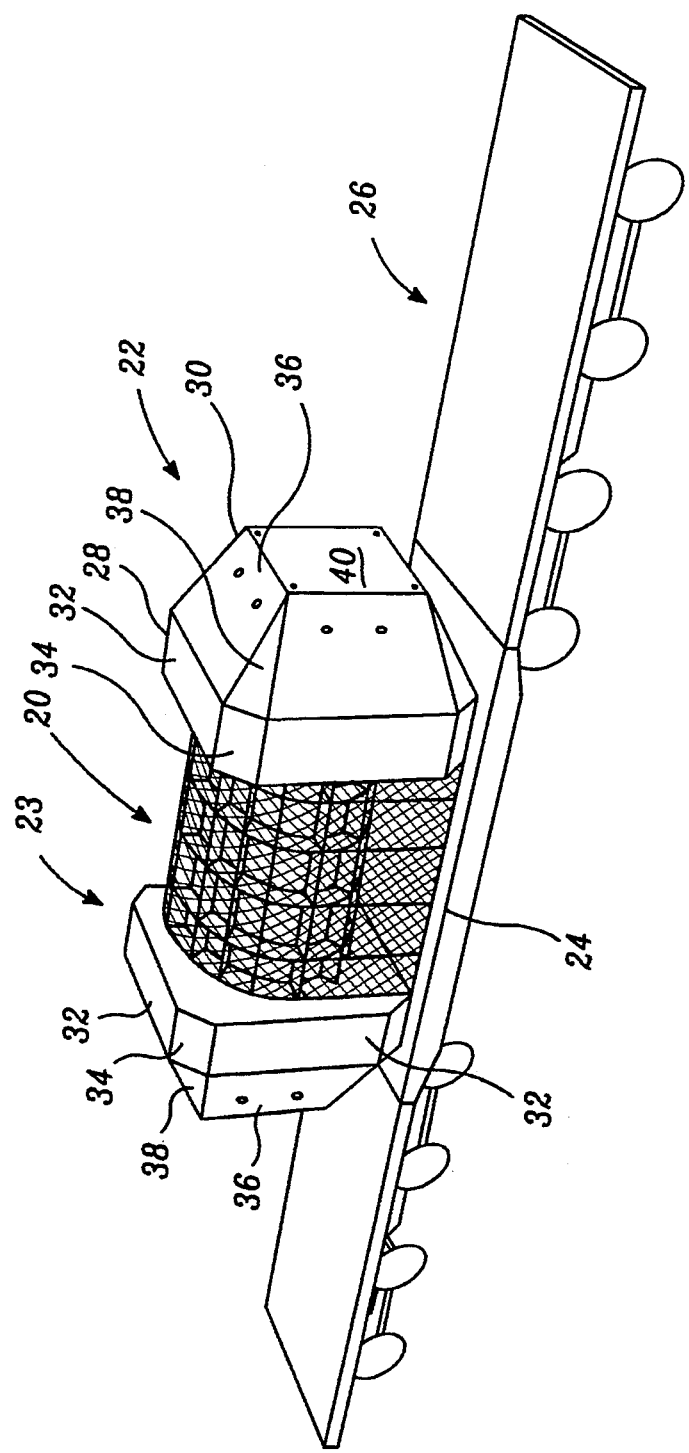
FIG. 1 is a perspective view of a front and a rear impact limiter positioned on the forward and rearward ends of a nuclear fuel transportation cask formed in accordance with the present invention.

Referring to FIG. 1 of the subject application, a transportation cask (phantom lines in FIG. 2) carrying the canister/basket combination is enclosed by a skid 20, and front impact limiter 22 and rear impact limiter 23 formed in accordance with the present invention rests horizontally on conventional trailer 26. In FIG. 1, the transportation cask is not visible, as it is completely encased by skid 20 and impact limiters 22 and 23. Skid 20 is further enclosed by a curtain of expanded metal 24, which further obscures skid 20 and the transportation cask. The curtain of expanded metal 24 is provided around skid 20 in order to shield skid 20 and the transportation cask from sunlight.

In FIG. 1, the longitudinal axis of the transportation cask is parallel to the length of trailer 26. Front impact limiter 22 is positioned on the forward end of the generally cylindrical transportation cask, and rear impact limiter 23 is positioned on the opposing rearward end. Skid 20 supports the transportation cask along its length between impact limiters 22 and 23.

In accordance with the present invention, impact limiters 22 and 23 include peripheral outer surfaces that are non-circular, e.g., multisided. In the illustrated embodiment, impact limiters 22 and 23 are generally octagonal elements that include an annular, generally octagonal body 28 and a tapered cap 30 which has a periphery in a cross section perpendicular to the longitudinal axis of the transportation cask that approximates an octagon. The outer surface of impact limiters 22 and 23 are essentially identical. The following description regarding impact limiter 22 is equally applicable to impact limiter 23. The same reference numerals for similar elements are used for impact limiters 22 and 23. In the illustrated embodiment, the exterior of annular body 28 includes four primary sides 32, each separated by a smaller secondary side 34. The exterior of tapered cap 30 is a truncated conical member with a plurality of sides. In the following description of the illustrated embodiment, representative dimensions are provided; however, it should be understood that these relative dimensions may be varied, depending on the particular size of the transportation cask and other design factors, such as impact resistance, space envelope available, and construction materials. In addition, the following description includes exemplary materials of construction, which also can be varied due to a number of concerns, such as those listed above.

Figure 2A:
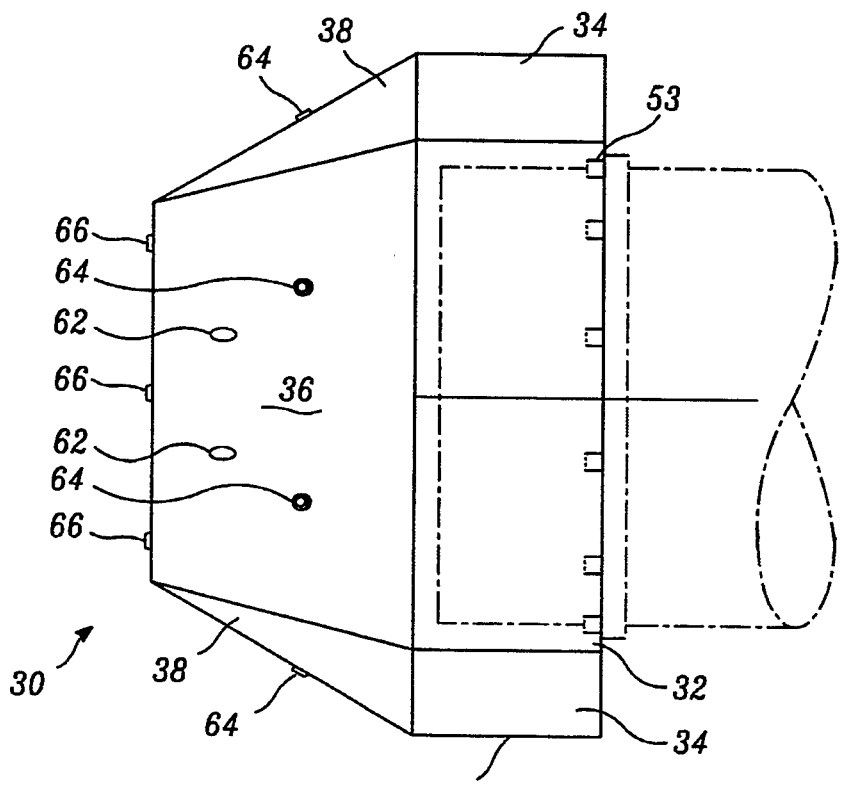
FIG. 2A is an elevation view of one side of the front impact limiter of FIG. 1.
Figure 4A:
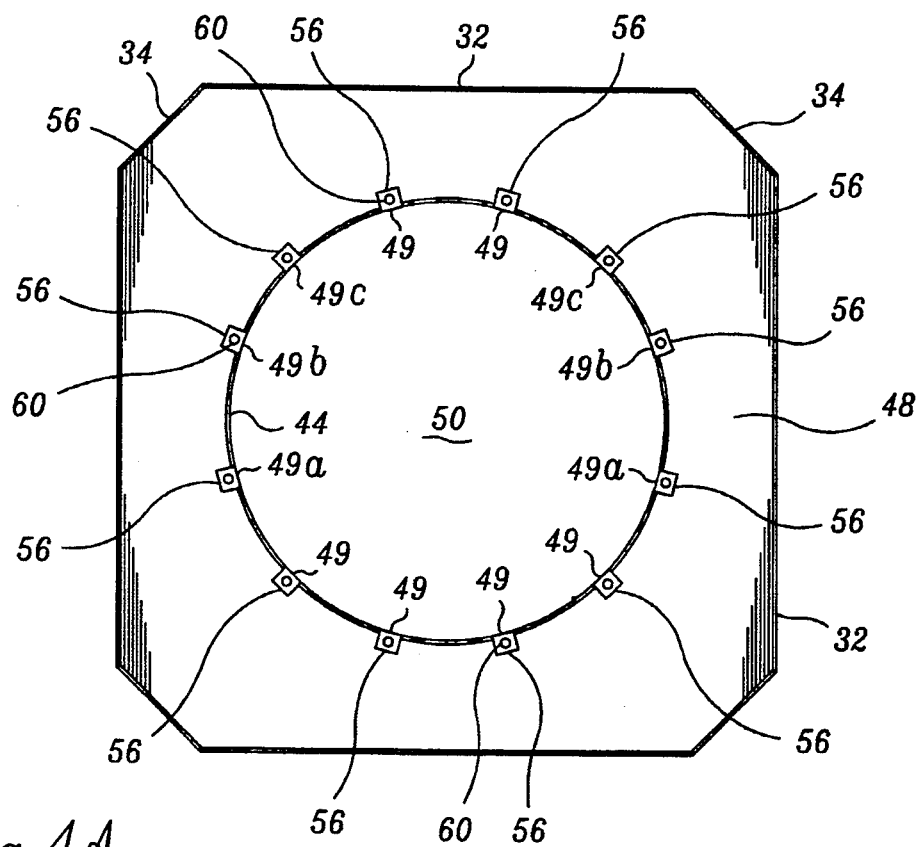
FIG. 4A is a plan view of the inboard end of the impact limiter of FIG. 2A.
Figure 5:
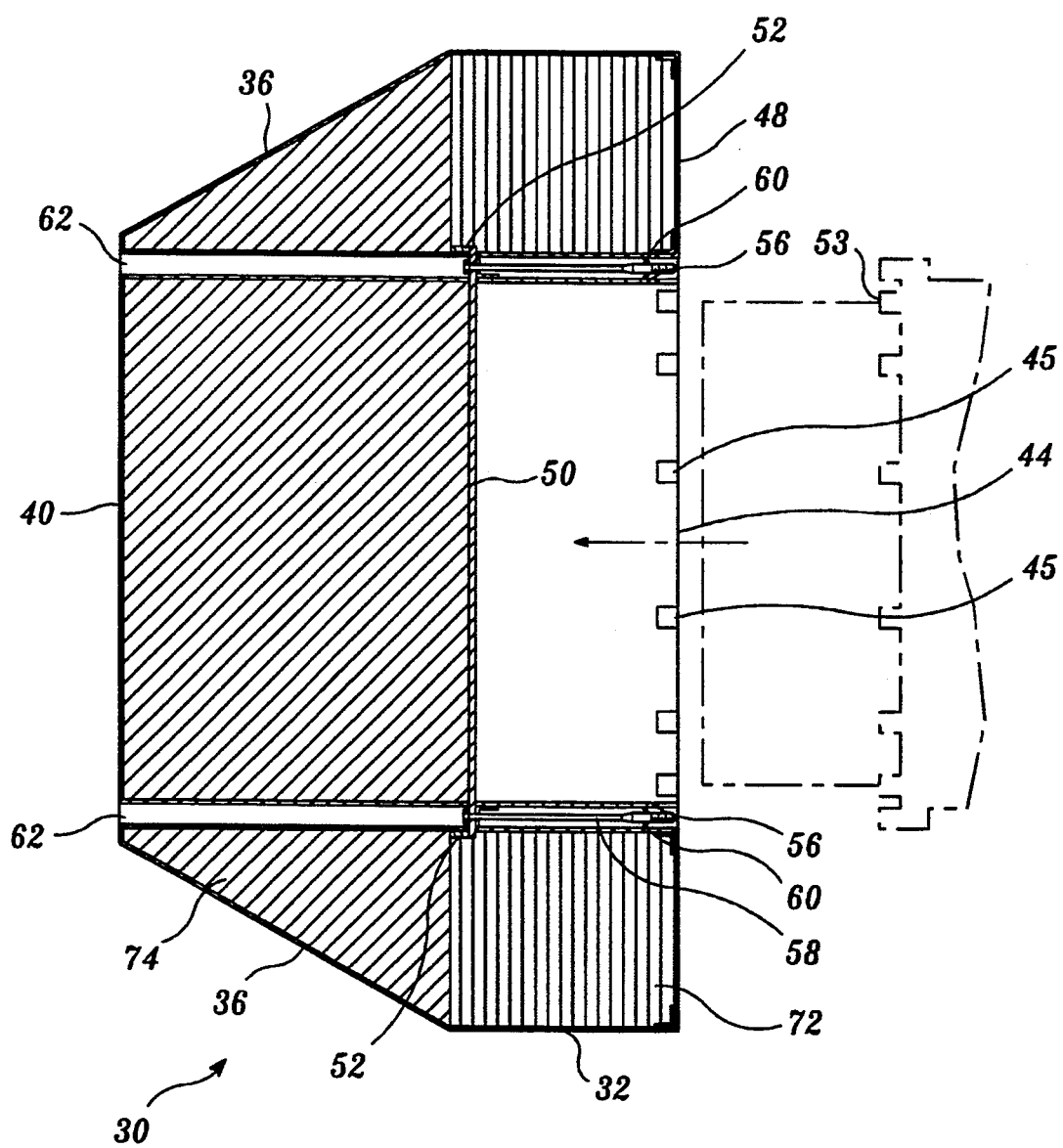
FIG. 5 is a view along section 5-5 in FIG. 3.

Referring additionally to FIGS. 2A, 4A, and 5, primary side 32 and secondary side 34 of impact limiter 22 each have a width extending in the direction parallel to the longitudinal axis of the transportation cask that is equal. The length of primary side 32 in a direction transverse to the longitudinal axis of the transportation cask is greater than the length of secondary side 34 in a direction transverse to the longitudinal axis of the transportation cask. In the illustrated embodiment, primary side 32 is approximately four times longer than the length of secondary side 34.

In the illustrated embodiment, the length of primary side 32 is approximately 95 inches and the length of secondary side 34 is approximately 23 inches. The width of primary side 32 and secondary side 34 in a direction parallel to the longitudinal axis of the transportation cask is approximately 35.5 inches.

Figure 3:
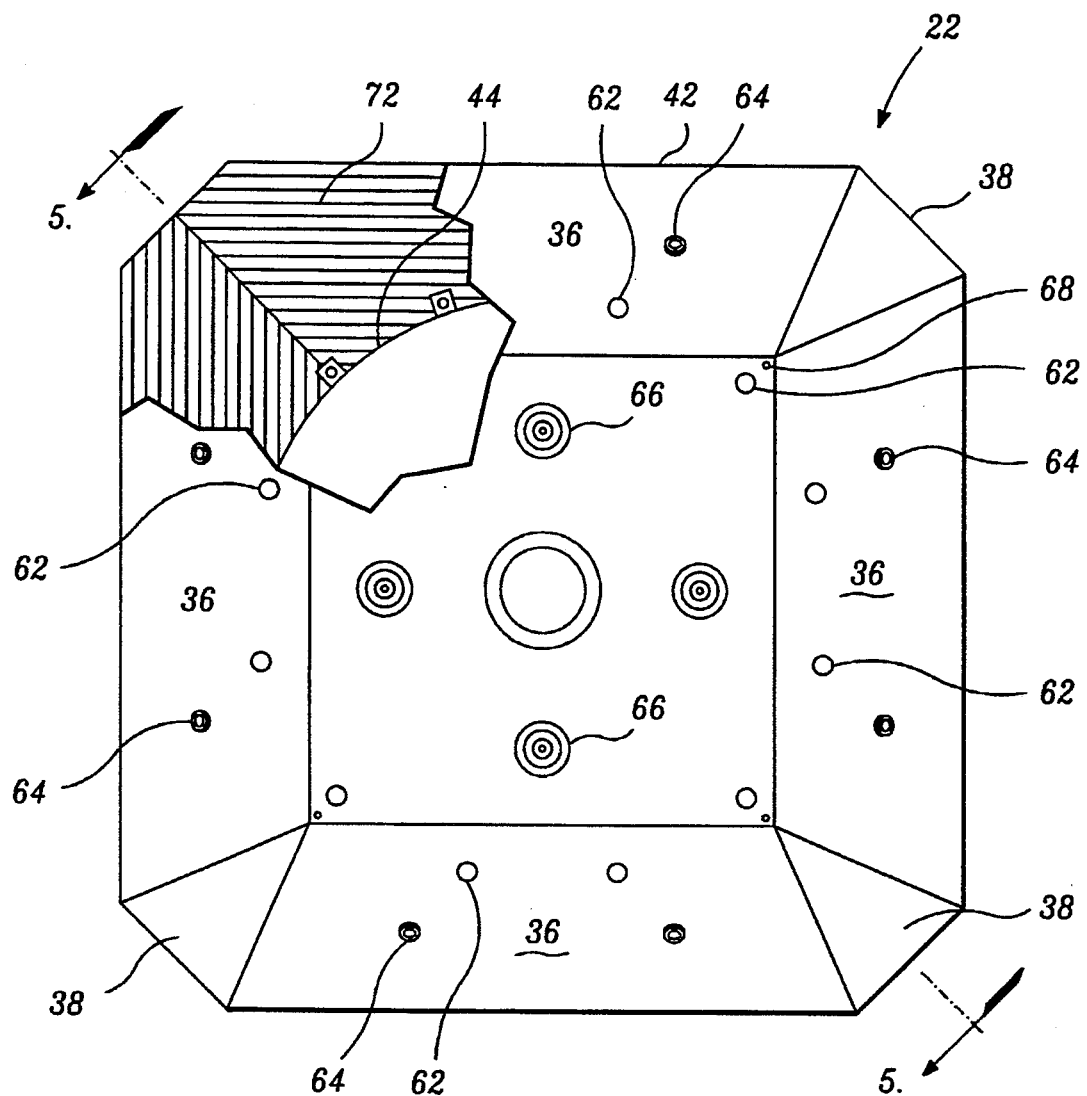
FIG. 3 is a plan view of the outboard end with a portion cut away of the impact limiter of FIG. 2A, the same plan view of the impact limiter of FIG. 2B being identical.

Referring additionally to FIG. 3, tapered cap 30 of impact limiter 22, like annular body 28, includes an outer shell defined by four primary sides 36 each separated by a secondary side 38. Tapered cap 30 also includes a substantially square end plate 40 opposite annular body 28. Tapered cap 30 extends in a direction parallel to the longitudinal axis of the transportation cask from an end of annular body 28 opposite the transportation cask. Square end plate 40 is spaced apart from annular body 28 along the longitudinal axis of the transportation cask. End plate 40 has sides whose lengths are less than the length of primary sides 36. In the illustrated embodiment, the sides of end plate 40 are about 70 inches long and end plate 40 is spaced apart from annular body 28 about 49 inches. The parallel sides of trapezoidal-shaped primary sides 36 are defined by the edge of primary sides 36 opposite the transportation cask and one side of square end plate 40. The longer of the two parallel sides corresponds to the edge of primary side 36. The nonparallel ends of trapezoidal-shaped primary sides 36 are equal in length. Secondary sides 38 are triangular and include a base defined by the edge of secondary side 34 opposite the transportation cask and by one nonparallel end from the two primary sides 36 that are on either side of secondary side 38. Accordingly, the combination of primary side 36, secondary side 38 and end plate 40 provides a tapered cap 30 in the shape of a truncated conical element having an outer periphery in a plane parallel to end plate 40 that approximates an octagon.

Figure 2B:
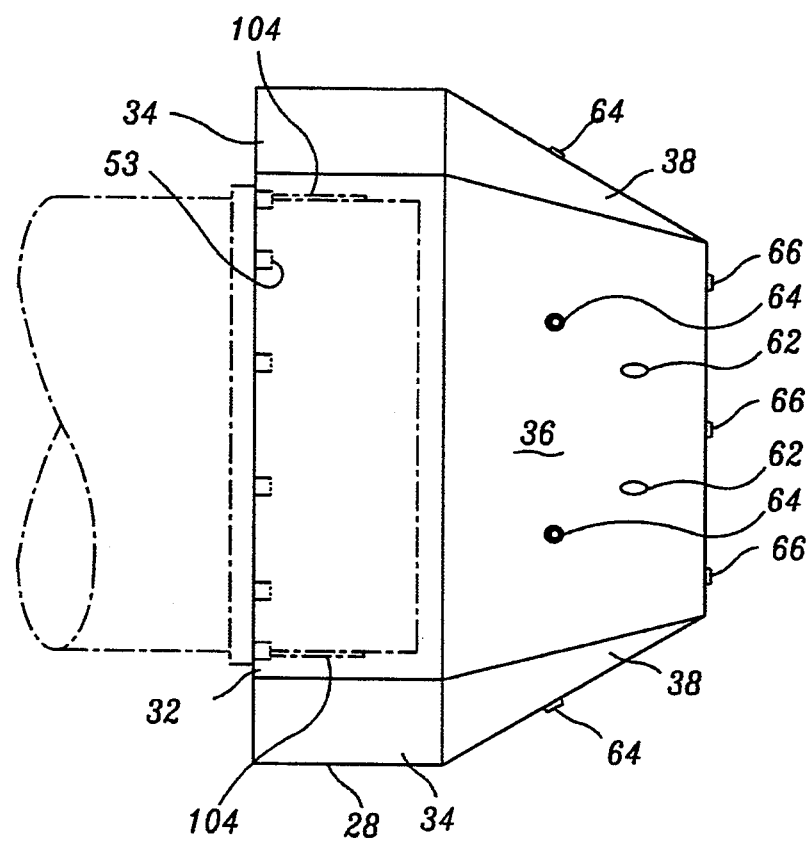
FIG. 2B is an elevation view of one side of the rear impact limiter in FIG. 1.
Figure 4B:
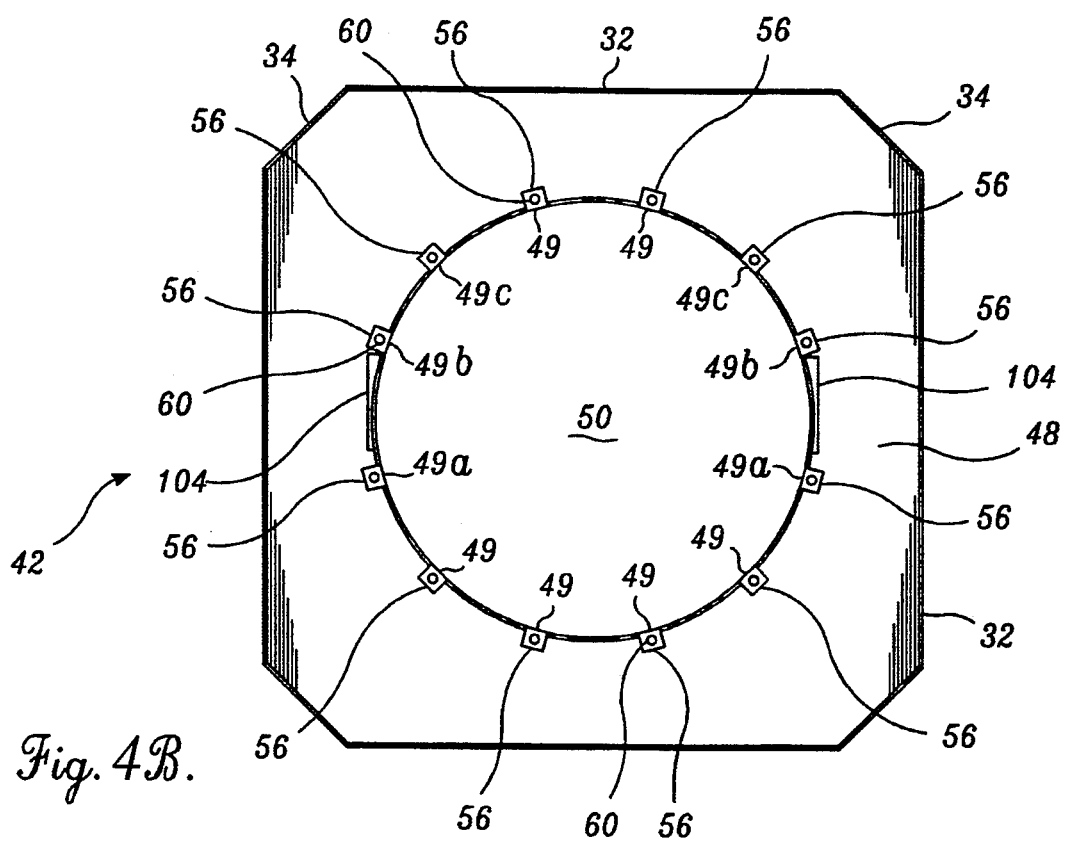
FIG. 4B is a plan view of the inboard end of the impact limiter of FIG. 2B.

Referring additionally to FIGS. 2B and 4B, rear impact limiter 23 is illustrated and as noted above includes an outer surface that is substantially identical to the outer surface described above with respect to impact limiter 22.

Referring to FIG. 4A, annular body 28 of impact limiter 22 includes an outer shell 42 comprising primary sides 32 and secondary sides 34, described above, and a round inner shell 44 that is concentrically located relative to outer shell 32. In the embodiment illustrated in FIG. 4A, inner shell 44 is circular and has a diameter of approximately 84 inches and a height of about 32.5 inches. The end of inner shell 44 opposite tapered cap 30 includes twelve substantially equally-spaced notches (45 in FIG. 5) that, in the illustrated embodiment, are approximately three inches wide and three inches deep. The spacing between notches 45 is such that they are aligned with notches 49, 49a, 49b, and 49c and bolt conduits 56 described below for securing impact limiter 22 to a transportation cask. Inner shell 44 and outer shell 42 define an annular space therebetween. It should be understood that the respective sides and various elements of annular body 28 and tapered cap 30 can be formed by connecting individual plates of metal, such as type 304 stainless steel having a thickness of about $\frac{1}{4}$ inch by conventional means such as welding. The end of annular body 28 opposite end cap 40 is closed by cover plate 48, which is an annular ring extending between outer shell 42 and inner shell 44. Cover plate 48 has an outer periphery that substantially matches the outer periphery of annular body 28. The inner periphery of cover plate 48 includes a bore having a diameter which in the illustrated embodiment is approximately 84 inches. This bore includes substantially square notches 49, 49a, 49b, and 49c for allowing bolt conduits 56 (described below in more detail) to pass through cover plate 48. In the illustrated embodiment, notches 49 are spaced apart from each other about 30 degrees. Notches 49a are spaced from the adjacent notches 49 about 30 degrees and notches 49b by about 35 degrees. Notches 49b are spaced from notches 49c by about 25 degrees. Notches 49c are spaced from adjacent notches 49 about 30 degrees. The variable spacing between notches 49, 49a, 49b, and 49c in impact limiter 22 is not required and other spacings such as equal spacing are within the scope of the present invention. Cover plate 48 around its outer periphery includes a 90° elbow of metal to which outer shell 42 of annular body 28 can be secured by conventional means such as welding. Attached to the end of inner shell 44, opposite cover plate 48, is a circular plate 50. Circular plate 50 is centered along the axis of inner shell 44. In the illustrated embodiment plate 50 has a diameter of about 91 inches. Extending at a 90° angle from the periphery of plate 50 towards end plate 40 is a lip of metal that forms shear stop (52 in FIG. 5). Shear stop 52 provides a lip that acts to oppose the shearing of the foam impact absorbing material along the plane where the honeycomb impact absorbing material and the foam impact absorbing material meet. In the illustrated embodiment, plate 50 is a type 304 stainless steel having a thickness of about 0.5 inch. Shear stop 52 is formed from the same 0.5 inch thick 304-type stainless steel and has a length of approximately 3.5 inches. Circular plate 50 adjacent its periphery includes twelve substantially equally-spaced bores for allowing bolts (58 in FIG. 5) to pass therethrough. The spacing between these bores is such that they can be aligned with notches 49, 49a, 49b, and 49c. Though not illustrated, plate 50 on its exposed surface includes a means for isolating the transportation cask from plate 50. One way of accomplishing this isolation is through the attachment of a concentric spacer ring approximately $\frac{1}{4}$ inch high and $\frac{1}{4}$ inch wide to plate 50. It is desirable to space the transportation cask from plate 50 in order to decrease the risk that heat from transportation cask will cause plate 50 to become hot enough so as to damage the underlying foam, which is described below in more detail. Conversely, spacing the transportation cask from plate 50 provides an air gap that protects the seals on the transportation cask from damage caused by overheating should the exterior of the impact limiter be exposed to high temperatures, for example, during a fire incident.

Secured to the outer surface of inner shell 44 within the annular space between inner shell 44 and outer shell 42 are twelve bolt conduits 56 for receiving bolts 58. Bolt conduits 56 are essentially tubular elements which in the illustrated embodiment have a length of approximately 32.75 inches. Bolt conduits 56 include a receiving end for receiving bolt 58 which is secured to the exposed surface of plate 50 aligned with one of the twelve bores in plate 50 described above. Bolt conduits 56 extend to cover plate 48 and are attached to cover plate 48 within notches 49, 49a, 49b, and 49c and aligned with notches 45. Bolt conduits 56 are essentially three-sided elongate members with the three sides forming three quarters of a square tube. The fourth side of the square tube which defines bolt conduits 56 is provided by inner shell 44. As briefly noted above, bolt conduits 56 provide a passageway for a plurality of longnecked bolts 58 that serve to secure impact limiter 22 to the transportation cask as described below in more detail. Notches 45 and bolt conduits 56 are sized to receive lugs identified by reference numeral 53 on the transportation cask in FIGS. 2 and 5. The cooperation between lugs and the pocket formed by bolt conduits 56 and notches 45 serves to prevent rotation of the impact limiter relative to the cask. This serves to reduce shear stress on the bolts which otherwise would be the sole means of preventing rotation in the absence of the lugs and notch combination. Situated within each bolt conduit 56 in the opening adjacent cover plate 48 is a bolt guide 60 that serves to align the threaded ends of a bolt 58 with a corresponding threaded female member in lugs 53 on the transportation cask. Bolt guides 60 are square plates having a centrally located bore passing therethrough. Bolt guide 60 is dimensioned to fit within and be secured to bolt conduit 56. Bolt guides 60 are secured within bolt conduits 56 by conventional means, such as welding.

As noted above, impact limiter 23 is substantially identical to impact limiter 22. Referring to FIGS. 2B AND 4B inner shell 44 of impact limiter 23 at locations offset 180° from each other includes a rectangular slot 104 extending from the end of inner shell 44 adjacent cover plate 48 to a position approximately half way into the bore that receives the transportation cask. Slot 104 opposite cover plate 48 includes an arcuate end. Slot 104 disrupts the generally circular shape of inner shell 44 for impact limiter 23 and provides space for receiving structural elements such as support trunions that are located on the transportation cask. Impact limiter 22 does not include such a slot as the end upon which impact limiter 22 is positioned does not include trunions at a location where they would be received within impact limiter 22. In the illustrated embodiment, slot 104 is approximately 19 inches wide and 10 inches long.

Referring primarily to FIGS. 3 and 5, tapered cap 30 in the illustrated embodiment includes twelve substantially equally-spaced conduits 62 for receiving bolts 58. The spacing between conduits 62 corresponds to the spacing of notches 49, 49a, 49b, and 49c described above. Conduits 62 are axially aligned with bolt conduits 56 and in the illustrated embodiment are thin-walled tubes of 300 series stainless steel having a diameter of approximately 2" and a length sufficient to allow them to extend from the outer shell of tapered cap 30 to the unexposed side of plate 50. Conduits 62 are centered on a circle having a diameter that coincides with the diameter of the circle that bolt conduits 56 are centered within annular body 28. Accordingly, as illustrated in FIG. 3, four bolt conduits 62 extend from end plate 40 to plate 50 and eight bolt conduits 62 extend from respective primary sides 36 to plate 50. As described above, plate 50 at locations aligned with bolt conduit 62 includes 12 apertures for allowing the narrow neck of bolts 58 to pass therethrough while preventing the heads of bolts 58 from passing therethrough. Accordingly, impact limiter 22 is secured to the transportation cask using bolts 58 that are not directly exposed to impacts which could exert high shear forces on the bolts.

Outer shell of tapered cap 30 includes a number of other ports. End plate 40, in addition to bolt conduits 62, includes four safety valves 66 that are designed to rupture should pressure within impact limiter 22 exceed a predetermined level. Examples of situations where pressure within impact limiter 22 may exceed predetermined levels include heating of the foam within impact limiter 22 caused by a rising external temperature. The build-up of pressure within impact limiter 22 can result in a blow-up of the impact limiter unless the gas is vented. Safety valves 66 in the illustrated embodiment are pipe fittings which have been secured within bores passing through outer shell 30 by conventional means, such as welding. The pipe fittings are plugged with a conventional plastic pipe plugs that soften with rising temperature. Softening of the pipe plugs combined with pressure build-up within impact limiters 22 or 23 causes the plugs to rupture and relieve pressure within the limiters. Though not required, additional safety valves 64 can be provided in primary sides 36.

Located at the four corners of end plate 40 are vent holes 68 which, as described below in more detail, are present in order to relieve pressure buildup during the pouring of the foam and its actual foaming.

Centrally located within end plate 40 is an access port 70 through which foam is poured as described below.

Referring primarily to FIG. 5, in order for impact limiters 22 and 23 to absorb energy during impact and protect the transportation cask, an impact absorbing material 72 is contained within annular body 28 and a different and distinct impact limiting material 74 is located within tapered cap 30. The use of two different and distinct types of impact absorbing material provides a means to take full advantage of the crush properties of more than one material. By using the different materials, optimum properties of each can be used to provide advantageous designs. For example, in the illustrated embodiment, a honeycomb material with cross-laminated corrugations is used as impact absorbing material 72 and a foam material is used as impact absorbing material 74. In FIG. 5, the honeycomb impact absorbing material 72 is depicted schematically without illustrating the cross-laminated corrugations. Also, FIG. 5 depicts a cross-section of impact limiter 22, it should be understood that the same cross-section of impact limiter 23 would include slot 104.

The use of a honeycomb with cross-laminated corrugations in the annular body around the transportation cask where elevated temperatures may be encountered is advantageous because the honeycomb can be machined from materials that exhibit minimal temperature dependencies and thus will give more uniform results over a wider range of temperatures. In addition, honeycomb with cross-laminated corrugations exhibit crush properties that are desirable in locations where the space available for crushable material, is limited.

Figure 6:
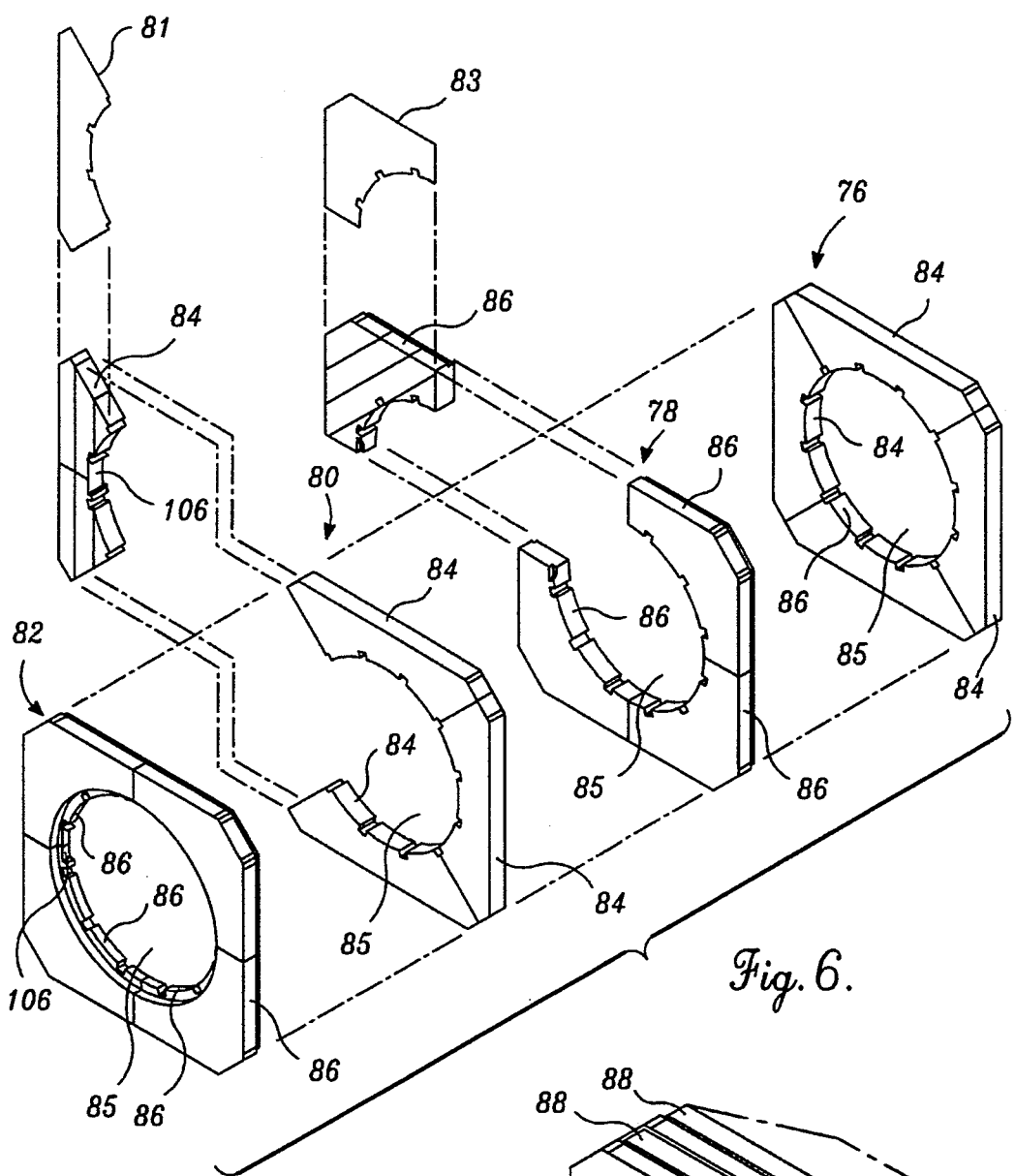
FIG. 6 is a schematic exploded view of four layers of honeycomb with cross-laminated corrugations carried within the impact limiter of FIG. 2B formed in accordance with the present invention.
Figure 7:
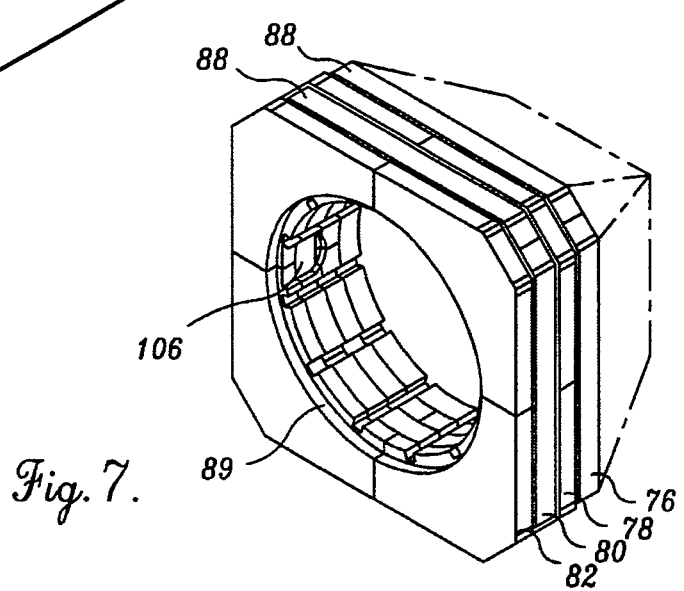
FIG. 7 is a perspective view of the honeycomb sections of FIG. 6 in an assembled configuration in accordance with the present invention.

Referring to FIGS. 5, 6 and 7 in the illustrated embodiment, the preferred honeycomb material is a multi-directional aluminum honeycomb which has an essentially uniform crush strength in any orientation within a plane and a lesser strength in a direction perpendicular to that plane. This type of honeycomb material differs from conventional honeycomb which is very directional in a given plane. Such honeycomb materials have corrugations that are cross-laminated in alternating layers. Exemplary types of such aluminum honeycomb material are available from Alcore, Inc., Belcamp, Md., under the name Trussgrid Honeycomb. Another type of aluminum honeycomb material is available from Hexcel Corporation, Dublin, Calif., under the name CrossCore. An exemplary honeycomb material has a nominal static crush strength of 1,650 PSI, a minimum strength of not less than about 1,400 PSI when tested at 200° F. and 67 feet per second dynamic crush rate (FPS), and a maximum strength of not more than about 1,950 PSI when tested at −20° F. and 67 FPS.

In the illustrated embodiment, the honeycomb material for impact limiter 23 is provided in the form of four distinct layers 76, 78, 80 and 82 laminated in an axial direction relative to the cask. Layers 76, 78, 80, and 82 are sized to fit between inner shell 44 and outer shell 42 of annular body 28. Layers 78, 80 and 82 include a rectangular cutout 106 on their inner periphery to account for slot 104. Though not illustrated, layers 76, 78, 80 and 82 for impact limiter 22 are identical to the same layers used in impact limiter 23 with the exception that rectangular cutout 106 to accommodate for slot 104 is unnecessary. In the illustrated embodiment, individual layers 76, 78, 80 and 82 of honeycomb material are each approximately 8.8 inches thick. Layers 76 and 80 are formed from four blocks 84 having a generally rectangular shape. Each of the four blocks 84 that form layers 76 and 80 are substantially identical with the exception that two blocks 84 of layer 80 include a cutout portion as described above. Each block 84 is made up of smaller sections of the aluminum honeycomb material. The joints between adjacent blocks 84 in layers 76 and 80 are formed by aluminum sheets (not shown) positioned in the joint with an epoxy resin providing the adhesion. In the illustrated embodiment, the aluminum sheet material is 28 gauge. Layers 78 and 82 are each composed of four generally triangular blocks 86 which are also joined to each other using aluminum divider sheets and epoxy resin. Block 86 of layer 82 includes a cutout portion as described above. Sheets of aluminum used to form the joints are also used to seal the cell ends for each layer 76, 78, 80 and 82 by encasing each layer around its periphery. Adjacent layers 76, 78, 80 and 82 are adhered to each other using epoxy resin and sheets of aluminum. In the embodiment illustrated in FIG. 6, sheets 81 of aluminum are cut to the shape of blocks 84 and sheets of aluminum 83 are cut to the shape of blocks 86. Alternatively, a single sheet of aluminum could be cut out to the shape of the individual layer in order to provide the bond line necessary to adhere adjacent layers together. Each layer 76, 78, 80 and 82 includes a centrally located bore 85 which is sized to allow the individual layers to encompass and surround inner shell 44. In addition, bore 85 includes notched cutouts 87 that mate with bolt conduits 56. Layer 82 of the honeycomb material differs slightly from layer 78 and includes a seat 89 adjacent bore 85 for mating with the shell of impact limiters 22 and 23.

Layers 76 and 80 include joint lines between adjacent blocks 84 that are offset 45° from the joint lines between adjacent blocks 86 of layers 78 and 82. By offsetting the joint lines, the risk of the cask wedging apart the individual blocks in all of the layers is reduced due to the discontinuity of the joint lines. The individual layers are adhered to each other using the same epoxy that connects the individual blocks. The formed block of honeycomb material has dimensions that allow it to fit within annular body 28; however, the block of honeycomb material is not secured or adhered to outer shell 42 or inner shell 44.

In the illustrated embodiment, the block of honeycomb material on its outside periphery includes two rows of spaced-apart 0.75 inch deep grooves that make the contact surface between the honeycomb material and the inside surface of outer shell 46 approach approximately 45% of the overall outer surface area of the honeycomb block. By providing the grooves 88 around the honeycomb block, the resistance to crush force on the exterior of the annular body is reduced. In other words, grooves 88 tend to soften the impact limiter at least near the honeycomb/outer shell interface. Softening near this interface is often desirable so that "soft" impacts, for example, a one-foot drop, are readily absorbed without any substantial damage to the impact limiter or cask, while still providing an impact absorbing structure that will protect the cask when impacts of greater magnitude are encountered.

The plane of strength of the honeycomb material should be oriented to be perpendicular to the longitudinal axis of the transportation cask. Because the aluminum honeycomb exhibits no strain hardening throughout its working crush range, when combined with a crush from the inside of the impact limiter, an essentially constant force-deflection crush is achieved. Depending on the particular orientation of the impact received by the impact limiter, the honeycomb material may absorb all or a portion of the impact. For example, a flat impact received on either primary side 36 or secondary side 30 will be absorbed primarily by the honeycomb. In contrast, a flat impact received on end plate 40 would be essentially absorbed by the foam material described below and the honeycomb material would not be active.

As described above, tapered cap 30 of impact limiter 22 encloses an impact absorbing material 74 different from the impact absorbing material 72. In the illustrated embodiment, impact absorbing material 74 is a closed cell polyurethane foam of nominal 15 pounds per cubic foot density. A preferred foam has virtually isotropic properties in a predetermined plane. The closed cell polyurethane foam is fire resistant, has low water absorption properties, and has predictable crush properties. The foam is introduced into tapered cap 30 through access port 70. In order to avoid adhesion between the foam and the inside surface of tapered cap 30 and the impact absorbing material 72, a release compound such as wax is applied to these surfaces prior to introduction of the foam. By preventing adhesion between the foam material and the underlying honeycomb, bonding of the materials, which generally creates a significant uncertainty with respect to the effect of an impact on the bond and the crush properties of the bonded materials, is avoided. By creating a design where the bond is not required, there is no concern about the quality of the joint that is provided. After the foam is poured into tapered cap 30, it expands and fills in tapered cap 30. Once expansion of the foam is complete, vents 68 and access port 70 are sealed. Using foam in tapered cap 30 introduces a material that changes crush properties with a change in temperature. For example, if the impact limiter is dropped on end plate 40, as the temperature goes up, the foam softens, which allows the foam to absorb the impact over a longer distance or stroke which results in lower loadings on the cask due to the impact. While the foam tends to harden as temperatures fall, the structural features of the cask that the foam is designed to protect also harden with colder temperatures, and accordingly, while the loads at colder temperatures will be higher due to a decreased stroke, the structures which are to be protected also can withstand higher loadings due to the lower temperatures.

Referring back to FIG. 1, the multisided design of an impact limiter formed in accordance with the present invention provides a plurality of surfaces for receiving an impact. Because such surfaces are generally planar, upon impact, a larger surface area is activated compared to an impact limiter which has a generally circular periphery. The "activated area" is the area of the impact absorbing material that will be crushed as the impact is absorbed. In other words, an impact limiter that has a circular periphery will receive an impact along some tangential line of contact and thus only a small area of the circular impact limiter will be initially activated. In order to compensate for this small area of activation, the stroke of the impact absorbing material necessary to absorb the force of the impact must be increased which results in a larger size for the impact limiter or the stiffness of the impact absorbing material must be increased which has the effect of increasing the potential load on the transportation cask. In contrast, when a plurality of substantially planar surfaces are provided, the area which is activated upon impact is likely to be larger. Activating larger areas upon impact is desirable so that more of the impact absorbing material can be utilized in order to absorb the force of the impact. By increasing the amount of area to be activated during a given impact, the length of the stroke necessary to absorb the impact can be reduced which reduces the overall size of the impact limiter. Also, the stiffness of the impact absorbing material can be reduced which reduces the loads on the casks as the impact is absorbed. Furthermore, by spreading the impact force out over a larger area on the exterior of the impact limiter, for certain orientations, the crush mechanism will occur from the inside out, rather than from the outside in. A crush mechanism from the inside out is desirable because of the large area of impact absorbing material that is activated.

The tapered cap of the impact limiter allows for a longer stroke for drop orientations where the size of the impact limiter is not restricted. In addition, the tapered cap also keeps the end portion which extends beyond the cask from influencing side drops or corner drops significantly. By proper selection of the taper as indicated by the embodiment described above, the loads on the cask for oblique drops and the resulting slap-down of the initially nonimpacted end can be minimized.

While the preferred embodiment of the invention has been illustrated and described, it will be appreciated that various changes can be made therein without departing from the spirit and scope of the invention. For example, different types of metals could be used for the various structural elements of the impact limiter and in the skid of the present invention. In addition, other types of honeycomb material or foam materials may be employed in accordance with the present invention. Finally, the dimensions described above are exemplary of the many different dimensions that could be employed depending on the particular size of the cask and the particular materials used to form the impact limiter in accordance with the present invention.

The embodiments of the invention in which an exclusive property or privilege is claimed are defined as follows:

1. An impact limiter for a nuclear fuel transportation cask comprising:
   an annular body having an inner periphery defined by an inner shell that mates with the transportation cask and an outer periphery defined by an outer shell that is non-circular, the annular body including an impact absorbing material between the inner shell and the outer shell; and
   a tapered cap projecting from the annular body, said tapered cap having an outer periphery defined by an outer shell that is non-circular, the tapered cap including an impact absorbing material within the outer shell.

2. The impact limiter of claim 1, wherein the outer shell of the annular body is multisided.

3. The impact limiter of claim 2, wherein the multisided outer shell of the annular body has four primary sides and four secondary sides arranged in an alternating pattern.

4. The impact limiter of claim 3, wherein the primary sides are larger in surface area than the secondary sides.

5. The impact limiter of claim 1, wherein the outer shell of the tapered cap is multisided.

6. The impact limiter of claim 5, wherein the multisided outer shell of the tapered cap includes four primary sides and four secondary sides arranged in an alternating pattern.

7. The impact limiter of claim 6, wherein the primary sides are larger in surface area than the secondary sides.

8. The impact limiter of claim 1, wherein the impact absorbing material between the inner shell and the outer shell of the annular body exhibits substantially isotropic crush characteristics in a predetermined plane.

9. The impact limiter of claim 8, wherein the impact absorbing material in the annular body is an aluminum honeycomb with cross-laminated corrugations.

10. The impact limiter of claim 9, wherein the aluminum honeycomb is arranged in multiple layers, each layer including a plurality of blocks formed from the aluminum honeycomb with cross-laminated corrugations.

11. The impact limiter of claim 10, wherein the outer periphery of two discrete layers of the aluminum honeycomb are spaced apart from the inner periphery of the outer shell of the annular body and the outer periphery of two other discrete layers contact the inner periphery of the outer shell of the annular body.

12. The impact limiter of claim 1, wherein the impact absorbing material of the tapered cap comprises a foam material.

13. The impact limiter of claim 12, wherein the foam material is a closed cell polyurethane foam.

14. The impact limiter of claim 12, wherein the foam contacts the inner surface of the outer shell, the surface of contact being free of adhesion between the foam and the outer shell.

15. The impact limiter of claim 12, wherein the foam and the impact absorbing material of the annular body are separated by a separating plate, the foam contacting the separating plate along a contact surface, the contact surface being substantially free of adhesion between the foam and the separating plate.

16. The impact limiter of claim 12, further comprising a spacer for reducing heat transfer from the transportation cask to the foam material.

17. The impact limiter of claim 1, further comprising a shear stop for opposing a force applied to the impact absorbing material within the outer shell and preventing shearing of the impact absorbing material within the outer shell from the impact absorbing material between the inner shell and the outer shell.

* * * * *

UNITED STATES PATENT AND TRADEMARK OFFICE
CERTIFICATE OF CORRECTION

PATENT NO. : 5,394,449
DATED : February 28, 1995
INVENTOR(S) : R.A. Johnson et al.

It is certified that error appears in the above-indentified patent and that said Letters Patent is hereby corrected as shown below:

| COLUMN | LINE | |
|---|---|---|
| 2 | Refs. Cited Other Pubs | "encloses" should read --enclosures-- |
| 2 | Refs. Cited Other Pubs | "encloses" should read --enclosures-- |
| 1 | 23 | "planes" should read --plant's-- |
| 4 | 3 | "Sislcy," should read --Sisley,-- |
| 4 | 19 | "Sislcy," should read --Sisley,-- |

Signed and Sealed this

Twenty-ninth Day of August, 1995

Attest:

*Attesting Officer*

BRUCE LEHMAN
*Commissioner of Patents and Trademarks*